United States Patent [19]

Morris, Jr. et al.

[11] Patent Number: 6,129,626
[45] Date of Patent: Oct. 10, 2000

[54] FAT REMOVING SKIMMER APPARATUS AND METHOD

[75] Inventors: William F. Morris, Jr., Raleigh, N.C.; Nathaniel A. Humphries, McLean, Va.

[73] Assignee: Morris & Associates Inc., Raleigh, N.C.

[21] Appl. No.: 09/369,372

[22] Filed: Aug. 6, 1999

[51] Int. Cl.[7] .................................................. A22C 21/00
[52] U.S. Cl. .......................................... 452/134; 452/198
[58] Field of Search .................................... 452/134, 198

[56] References Cited

U.S. PATENT DOCUMENTS

| | | | |
|---|---|---|---|
| Re. 35,259 | 6/1996 | Williams | 126/369 |
| Re. 35,510 | 5/1997 | McMurtry | 452/134 |
| 3,149,923 | 9/1964 | Hughes | 452/134 |
| 4,030,162 | 6/1977 | Hubbard | 452/134 |
| 4,184,229 | 1/1980 | Soran | 452/134 |
| 4,993,112 | 2/1991 | Burnett et al. | 452/134 |
| 5,154,664 | 10/1992 | Hazenbrorek et al. | 452/134 |

*Primary Examiner*—Willis Little
*Attorney, Agent, or Firm*—Jacobson, Price, Holman & Stern, PLLC

[57] ABSTRACT

Fat removal apparatus for removing fat from the surface of a liquid body includes a rotary fat skimmer mounted for rotation above said surface of the liquid body and a plate having an inclined front face surface and an outer periphery partially submerged in the liquid body, a fat removal opening is provided in the plate portion co-axially with respect to the axis of rotation of the plate, a spiral shaped fat capture flange extends forwardly from the surface of the plate and has an inner end at the fat removal opening centered in the plate and an outer leading end edge positioned radially outward from the fat removal opening to engage and remove fat from the surface of the liquid body and deliver it to the fat removal opening.

19 Claims, 6 Drawing Sheets

FAT REMOVING SKIMMER APPARATUS AND METHOD

BACKGROUND OF THE INVENTION

Young broiler type chickens that are grown commercially for market have a high percentage of both solid and liquid fat in their carcasses at time of evisceration at the slaughter plant. This creates a problem of substantial proportions when the poultry carcasses are chilled in a poultry chiller at the slaughter plant in an ice-water bath that is usually air-agitated for approximately one hour to reduce the carcass temperature to below 40° F. as required by regulations of the United States Department of Agriculture (USDA). The problem arises from the fact that substantial quantities of oil or fat are washed off of the carcass in the chilling process and are emulsified in the ice water by the air agitation to form a scum or layer of fat floating on the surface of the chilled water. The scum is quite unsightly and tends to coat the birds with an undesirable greasy film that reduces the appearance and quality of the finished product.

The water use in an elongated chiller tank or trough of a poultry chiller is normally chilled to approximately 32.5° F. by means of a separate remote shell and tube heat exchanger following which it is pumped into the bird outlet end of the chiller tank at the rate of approximately 400 to 600 gallons per minute. The water is continuously removed from the chiller tank and returned to the heat exchanges and cooled to 32.5° F. and pumped back into the chiller at the bird-outlet end of the chiller tank. The chilled water flows upstream toward the bird inlet end of the chiller against the movement of the carcasses toward the bird outlet end of the chiller, which movement of the carcasses is effected by conventional mechanical means, such as an auger or movable paddle members. The temperature of the chilled water increases to approximately 38° F. to 42° F. as it travels from the bird outlet end to the bird inlet end of the chiller.

The pump suction connection is provided in the bottom wall of a pump suction chamber attached to the outside of the bird inlet end of the chiller and which is designed so as not to interfere with the normal travel of the carcasses through the chiller. The pump suction chamber communicates with the main body of the chiller tank or trough through a series of closely spaced rods or a screen through which the water can flow into the pump suction chamber. However, the rods or screen prevent the carcasses from following the water into the pump suction chamber.

Unfortunately, the fat and "scum" that is accumulating on the surface of the water follows the water flow in the chiller and if the fat is not collected and disposed of, it soon becomes a two to three inch thick "foamy scum" that backs up from the pump suction chamber and eventually covers a major portion of the water surface in the chiller tank. A more-or-less continuous and costly manual skimming of the foamy scum accumulation that gathers in the pump suction chamber is consequently required for presently known chillers. The scum skimming operation is made difficult by the relatively small size of the pump suction chamber which is approximately 28" L×18" W×48" D and by the fact that the water level can vary vertically from 6" to 12" below the top edge of the chiller tank. Further difficulty arises from the fact that since the unit handles edible food products, any solution to the scum removal problem must satisfy all USDA requirements for sanitation and cleanability.

Therefore, it is a primary object of the present invention to provide a new and improved method and apparatus for removing floating fat from the surface of a body of liquid.

A more specific object of the present invention is to provide a new and improved apparatus and method for removing floating fat from the surface of chiller water in a poultry chiller tank.

Another object of the present inventions is the provision of power driven fat skimmer apparatus that can be attached to a poultry chiller without need for any modification of the poultry chiller.

A further object of the present invention is the provision of fat skimming apparatus that can be easily adjusted to optionally operate for removal of fat from the surface of a body of water for various flow conditions and water levels in the chiller tank.

SUMMARY OF THE INVENTION

Achievement of the foregoing and other objects of the present invention is enabled by the provision of a electronically driven mechanical skimmer means positioned over the water surface in the pump suction chamber of a conventional poultry chiller tank. The skimmer means includes a circular fat skimmer wheel including a rotary circular plate which is inclined relative to the water surface and is attached to the upper end of an electric motor driven hollow inclined shaft. The periphery of the rotary circular plate of the fat skimmer wheel extends downwardly below the water surface in the chiller tank and rotates through the layer of fat or scum on the surface of the water in the pump suction chamber. A spiral fat capture and removal fin or flange on the fat skimmer wheel spirals radially outward from an inner end edge adjacent to an axial fat removal opening in the circular wheel plate which is coaxially positioned relative to the upper end of an axial passageway in the driven hollow inclined shaft. The outer end of the spiral fat removal fin terminates at a leading edge adjacent the periphery of the skimmer wheel plate.

Rotation of the skimmer wheel causes the leading edge of the spiral fat removal fin or flange to move downwardly through the fat on the surface of the water then through the water and upwardly through the fat layer to trap a quantity of fat between the inner surface of the spiral fin or flange and the surface of the rotary circular plate. Continued rotation of the skimmer wheel causes downward flow of the fat along the spiral fin or flange by gravity to the inner end edge of the spiral fat removal fin or flange from which the fat falls into and through the downwardly inclined opening in the wheel plate and then into the axially extending passageway in the hollow shaft. The fat flows down the axially extending passageway in the hollow shaft and is discharged into a container for subsequent disposition.

Adjustment of the skimmer assembly for optimum operation is enabled by the fact that the hollow shaft and drive motor are all supported by a pivotally mounted support frame externally of an end wall of the pump suction chamber. The pivotal mounting is effected by upper rod hooks on opposite sides of the upper end of the support frame which engage the upper edge of an end wall of the pump suction chamber of the chiller tank. Adjustment screws are provided on the lower portion of the frame and are movable axially toward or away from the end wall of the suction chamber which they engage so as to adjust the angle of the support frame the hollow shaft and the fat skimmer wheel. Since the upper end of the hollow shaft on which the skimmer wheel is mounted extends over the end wall of the pump suction chamber, such adjustment of the adjustment screws varies the angle of the skimmer wheel relative to the surface of the water in the chiller tank and also raises or lowers the position of the lower edge of the skimmer wheel vertically relative to the surface of the water in the pump suction chamber.

Advantages achieved by the invention include the elimination of the need for constant manual maintenance while being in full conformity with USDA regulations. Moreover, the subject invention is economical to fabricate, use, clean and maintain.

DESCRIPTION OF THE PREFERRED EMBODIMENTS

Figure 1:
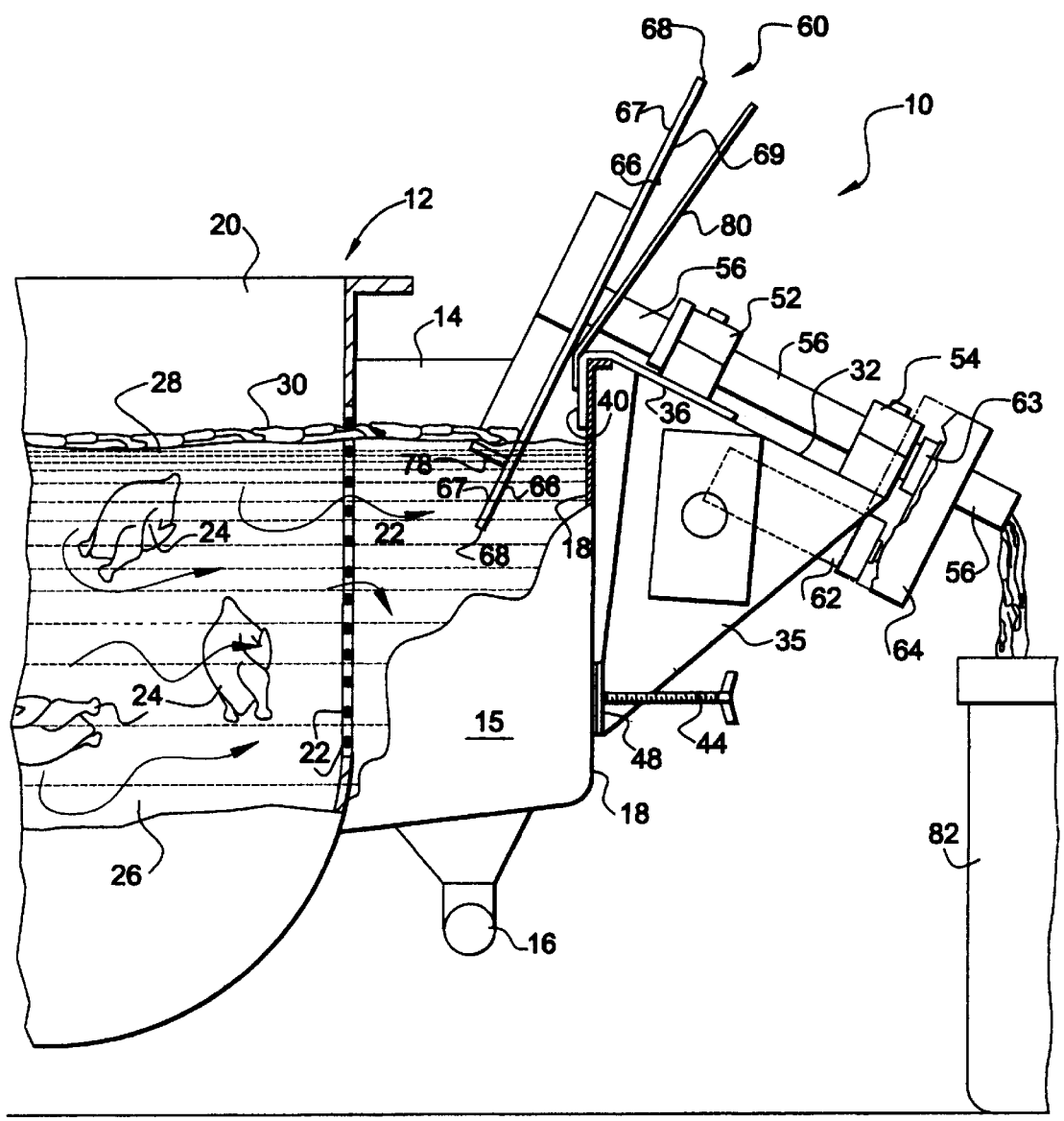
FIG. 1 is a right side elevation partially in section of the preferred embodiment of the invention.

Attention is initially invited to FIG. 1 of the drawings which illustrates the preferred embodiment of the fat skimmer, generally designated 10, of the invention which is mounted on the bird inlet end of a conventional poultry chiller tank or trough which defines a main chiller chanber 20. More specifically, the preferred embodiment is mounted on the pump suction chamber 14 which has an outlet line 16 connected to the inlet of a conventional pump (not shown). Pump suction chamber 14 is defined by a housing including a right sidewall 15, a left sidewall 17, and an endwall 18, and is separated from the main chiller chamber 20 by rods or screen means 22 which preclude entry of poultry carcasses 24 into pump suction chamber 14.

A body of chilled water 26 having a surface 28 moves in chamber 20 from left to right in the direction of the arrows shown in FIG. 1 and the carcasses 24 move from right to left by power driven mechanical means (not shown), such as augers or paddles. Liquid and solid fat particles in the form of a floating foam or scum layer 30 accumulates on the upper surface 28 as shown. The preferred embodiment acts to continuously remove the scum layer 30 in suction chamber 14 to prevent it from backing up toward the opposite bird outlet end of the main chiller chamber 20 as would otherwise occur absent such removal of the floating fat material.

Figure 2:
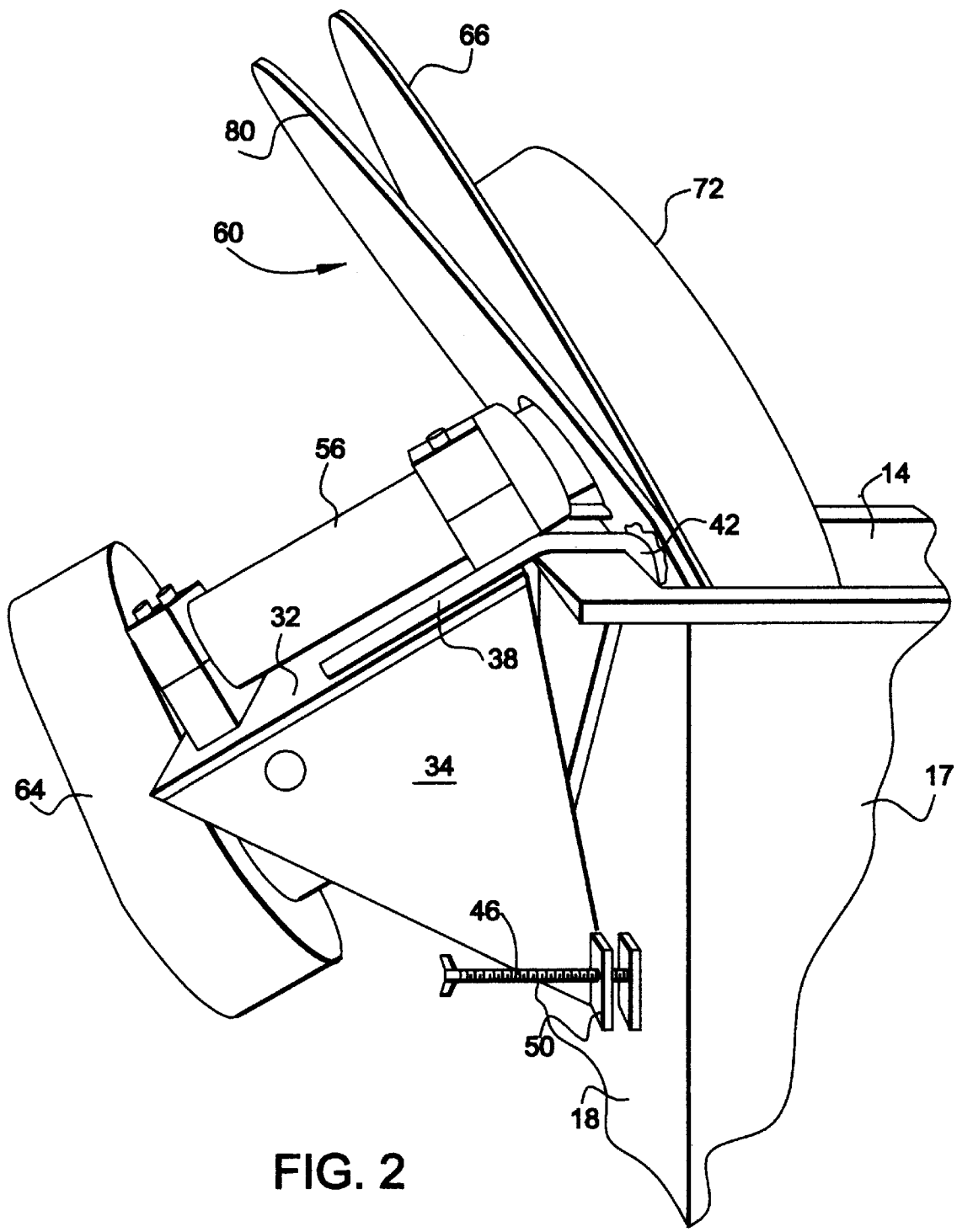
FIG. 2 is a left side perspective view of the preferred embodiment.
Figure 3:
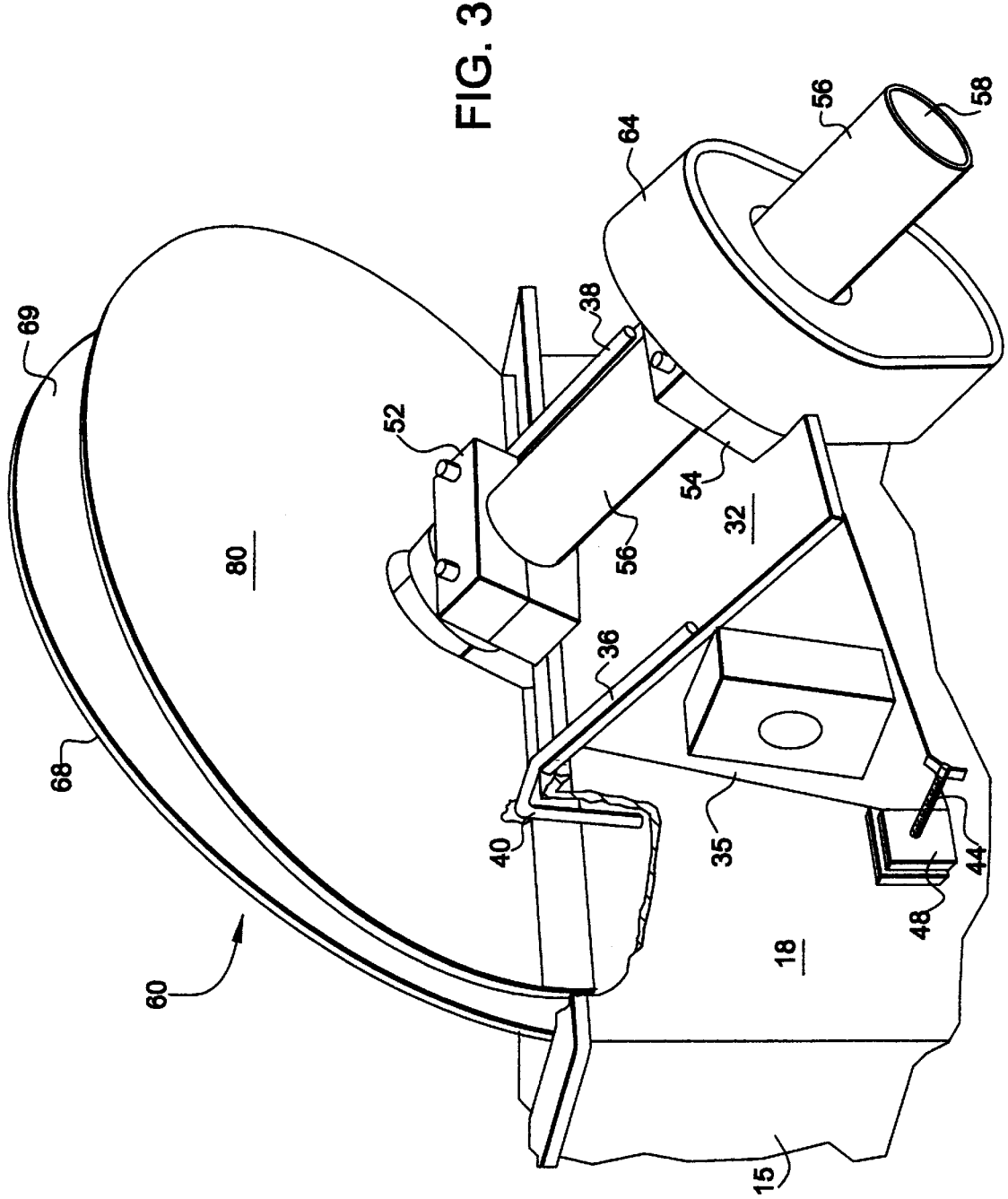
FIG. 3 is a left side rear perspective view of the preferred embodiment.

The preferred embodiment fat skimmer comprises a main support frame consisting of a top plate 32, a left side plate 34 (FIG. 2) and a right side plate 36 as shown in FIG. 1, respectively connected to, and extending downwardly from the left and right sides of top plate 32. Plates 32, 34 and 36 are unitarily formed together or fixedly connected to each other to provide a rigid structure which is attached to and supported by end wall 18 of pump suction chamber 14 by side rods 36 and 38 which respectively have hook portions 40 and 42 (FIG. 1) which extend over and are engaged with the upper end of wall 18 as best shown in FIG. 3 so that the weight of the skimmer apparatus 10 urges the apparatus in a clockwise direction as viewed in FIG. 1. First and second angle adjustments screws 44 and 46 are threaded into mounting tabs 48 and 50, respectively provided on side plates 34 and 36, so as to permit adjustment of the angle of the frame formed of plates 32, 34, 36 relative to endwall 18 for a purpose to be discussed.

Upper and lower plastic shaft support bearings 52 and 54 are attached to top plate 32 and provide rotary support for a hollow shaft 56 having an axial passage way 58 extending along its entire length. A rotary fat skimmer means comprising a fat skimmer wheel or the like generally designated 60 is fixedly attached to the upper end of shaft 56 for rotation therewith. Rotation is imparted to shaft 56 by a low speed electric gearmotor 62 through a belt 63 provided in a belt guard housing 64.

Fat skimmer wheel 60 comprises a circular plate portion 66 having an outer peripheral edge surface 68 that is concentric with respect to the axis of hollow shaft 56. Plate 66 is fixedly connected to hollow shaft 56 so that rotation of hollow shaft 56 about its axis results in rotation of plate 66 in a counter-clockwise direction viewed in FIGS. 4 and 5. Circular plate 66 has a front face surface 67, a rear face surface 69 and fat removal opening 70 which is concentrically aligned with the axes of peripheral edge surface 68 and the axis of the axial passage way 58 in hollow shaft 56. A drip shield 80 is fixedly attached to the hook portions 40 and 42 of side rods 36 and 38 for catching liquid material falling from the rear face surface 69 of circular plate 66.

Figure 4:
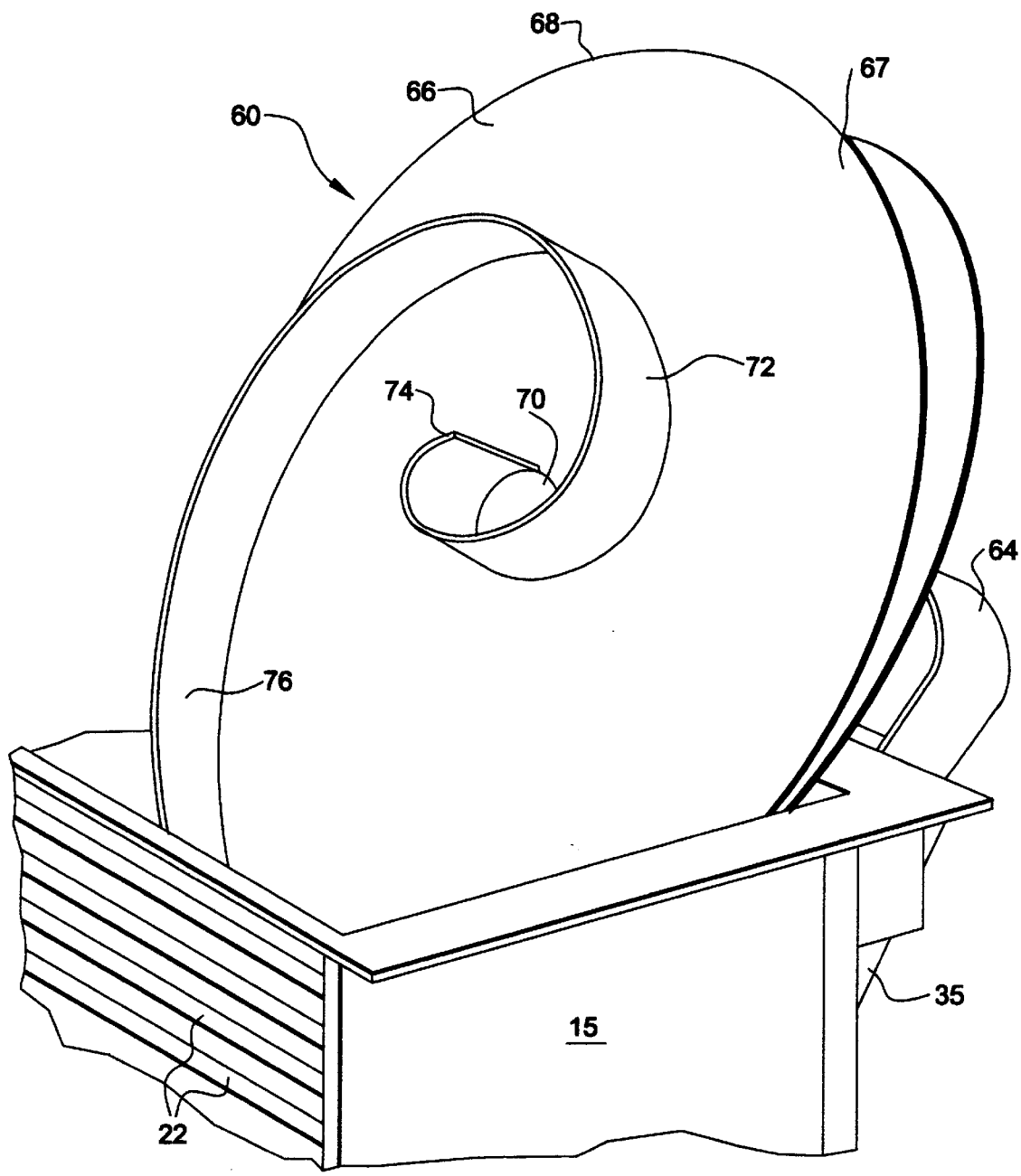
FIG. 4 is a right side frontal perspective of the preferred embodiment.

A spiral shaped fat catcher fin or flange 72 extends forwardly perpindicularly from front face surface 67 of circular plate 66 as shown in FIGS. 1 and 4. Fat catcher fin or flange 72 has an inner end edge termination 74 adjacent fat removal opening 70 as shown in FIGS. 4 and S. The spiral shaped fat catcher fin or flange 72 also includes a fat directing flow surface 76 (FIG. 4) and an outer leading end edge 78 (FIG. 5) which terminates adjacent the circular peripheral edge 68 of circular plate 66 as best shown in FIG. 5.

Figure 5:
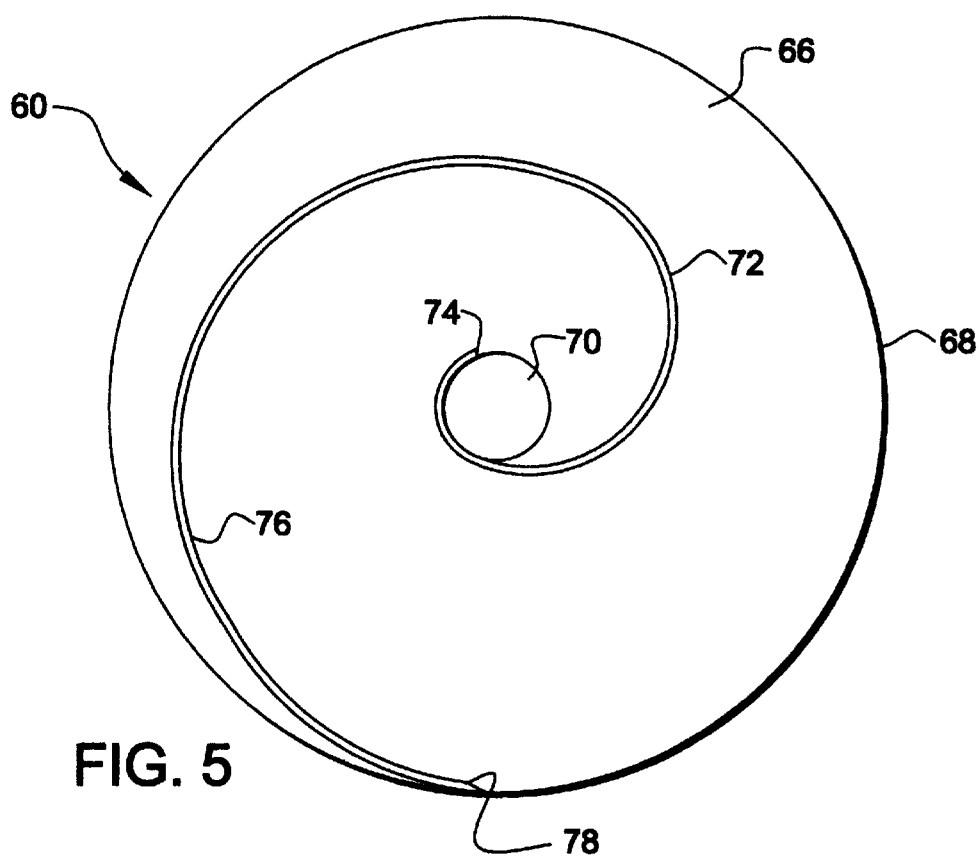
FIG. 5 is a frontal elevation view of the rotary skimmer means of the preferred embodiment.

Operation of the preferred embody is initiated by actuation of gearmotor 62 which operates to rotate fat skimmer wheel 60 in a counter-clockwise direction as viewed in FIGS. 4 and 5 so that the outer periphery 68 of plate 66 and leading edge 78 of fat catcher fin or flange 72 move downwardly through the layer of fat 30 and the surface 28 in pump suction chamber 14. Leading edge 78 moves through a lowermost position in the liquid shown in FIG. 1 following which the leading edge 78 moves upwardly through surface 28 and fat layer 30 to trap a quantity of the floating fat material between the fat directing flow surface 76 of fat catcher fin or flange 72 and the front face surface 67 of circular plate 66. Continued rotation of the fat skimmer wheel 60 causes the fat and water that has been picked up by the spiral shape fat catcher fin or flange 72 to flow along a V-shaped "trough" (in cross-section) defined by portions of surfaces 76 and 67 until it reaches the inner end termination edge 74 from which it flows into and through fat removal opening 70. The material entering opening 70 immediately exits into the axial passageway 58 of hollow shaft 56 for discharge from the lower end thereof into a receiving means 82 as shown in FIG. 1. Thus, each rotation of the fat skimmer wheel 60 results in the removal of a quantity of fat from the surface of the water and continued operation of the apparatus reduces the fat level in the main chiller chambers 20 in a desirable manner.

Figure 6:
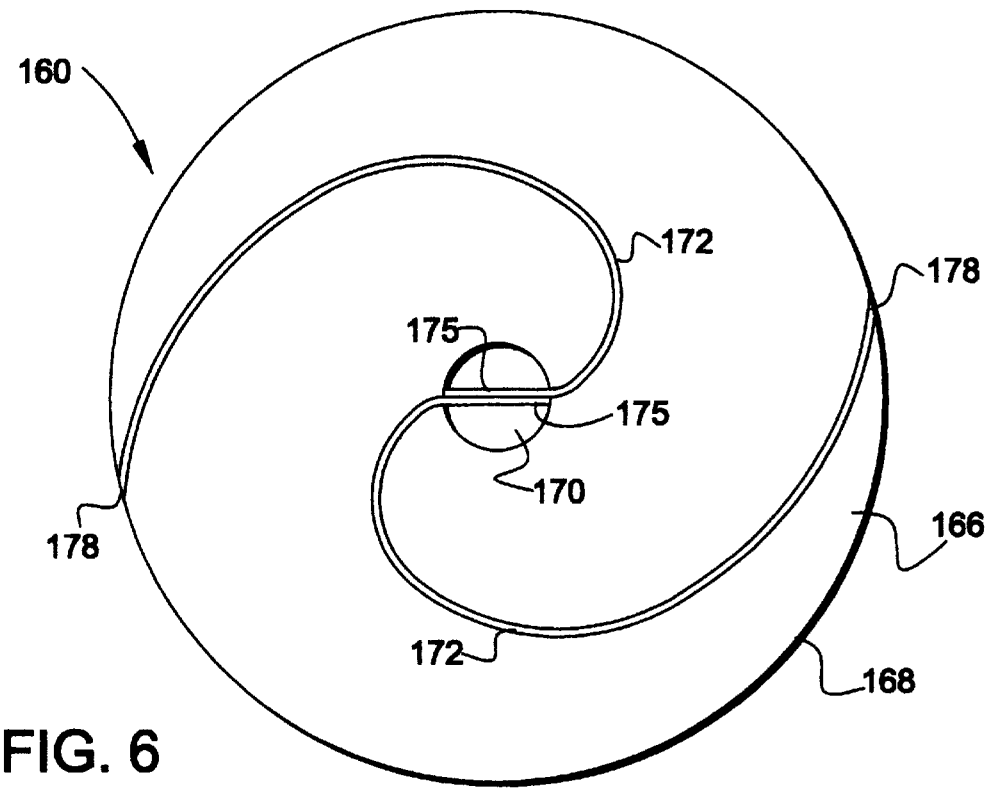
FIG. 6 is a front view of an alternative embodiment of the rotary skimmer means.

The second embodiment 160 of the fat skimmer wheel is illustrated in FIG. 6 and employs two identical spiral shaped fat catcher fins or flanges 172, having outer end leading edges 178 and having inner end terminations in the form of linear plates 175 which extend diametrically across fat removal opening 170. The operation of the embodiment of FIG. 6 is very similar to the operation of the embodiment of FIG. 5; however, the FIG. 6 embodiment results in two skimming operations for each revolution of the fat skimmer wheel 160. Consequently a greater volume of material can be removed from the upper surface of the body of water 26 for each revolution of the skimmer wheel.

Figure 7:
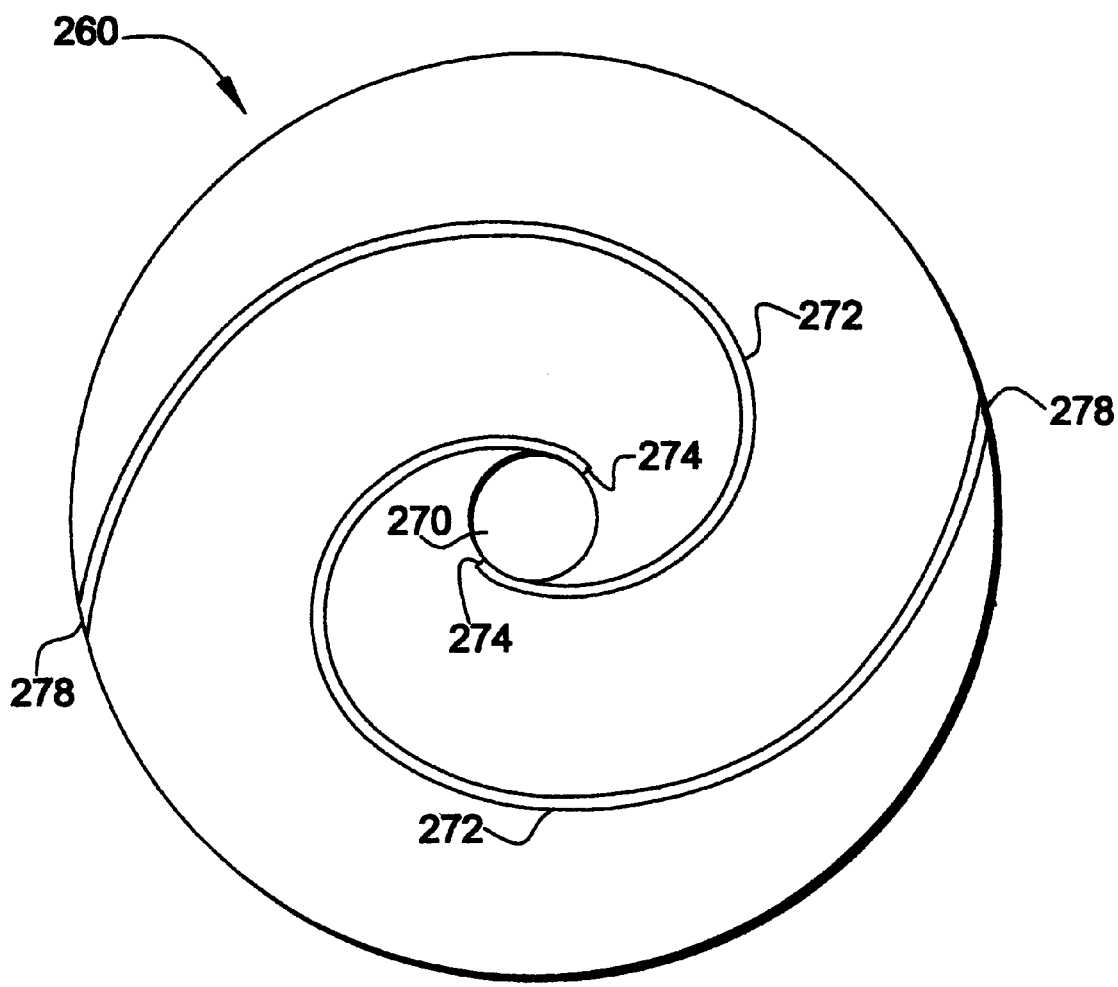
FIG. 7 is a frontal view of a further embodiment of the rotary skimmer means.

FIG. 7 illustrates the third embodiment 260 of the fat skimmer wheel which is similar to the embodiment 160 of FIG. 6 but differs in that it does not include the linear end portions 175 employed in embodiment 160. More specifically, the third embodiment 260 employs two spiral shaped fat catcher fins or flanges 272 which have inner termination edges 274 diametrically opposite each other with respect to fat removal opening 270. The spiral shaped fat catcher fins or flanges 172 have outer end leading edges to 278 which correspond in structure and function to the outer end edges 78 and 178 of the first two embodiments. In instances in which the fat particles being removed from the pump suction chamber are relatively large, the embodiment of FIG. 7 is more effective than the embodiment of FIG. 6 in that the larger particles can move into the fat removal opening 270 whereas they might be restricted from entering the fat removal opening 170 of the embodiment of FIG. 6.

While several embodiments are disclosed and described above, it should be understood that the spirit and scope of the invention is not limited to that described above but is to be limited solely by the appended claims.

What is claimed is:

1. Fat removal apparatus for removing fat from the surface of a liquid body, said apparatus comprising a rotary fat skimmer means positioned for rotation about an axis of rotation above said surface of said liquid body and including a plate portion having an inclined front face surface and an outer periphery partially submerged in said liquid body, a fat removal opening provided in said plate portion adjacent said axis of rotation, a fat capture flange means extending forwardly from said front face surface of said plate portion and having a fat directing surface and an inner end at said fat removal opening and an outer leading end edge positioned radially outward from said fat removal opening of said plate portion and power drive means drivingly connected to said plate portion for rotating said plate portion and said fat capture flange so that said outer end of said capture fat flange enters the liquid body and moves along an arcuate path through the liquid body and exits upwardly through the liquid fat on the surface of the liquid body so that fat above the fat directing surface is directed by the fat directing surface into said fat removal opening by continued rotation of said plate portion.

2. A fat removal apparatus as recited in claim 1, wherein said power drive means includes a hollow shaft having an internal axially extending passageway having an inlet end communicating with said for removal opening of said plate portion for receiving fat material therefrom and a discharge end for directing the received fat material into receiving means.

3. A fat removal apparatus as recited in claim 1, wherein said fat capture flange means is of spiral configuration.

4. A fat removal apparatus as recited in claim 1, wherein said front face surface is oriented at an obtuse angle relative to the surface of said liquid body.

5. A fat removal apparatus as recited in claim 2, wherein said fat capture flange means is of spiral configuration.

6. A fat removal apparatus as recited in claim 5, wherein said front face surface is oriented at an obtuse angle relative to the surface of said liquid body.

7. A fat removal apparatus as recited in claim 1, wherein said fat capture flange means comprises first and second spiral flange members.

8. A fat removal apparatus as recited in claim 7, wherein said power drive means includes a hollow shaft having an internal axially extending passageway having an inlet end communicating with said fat removal opening of said plate portion for receiving fat material therefrom and a discharge end for directing the fat material into receiving means.

9. A fat removal apparatus as recited in claim 8, wherein said front face surface is oriented at an obtuse angle relative to the surface of said liquid body.

10. A fat removal apparatus of claim 7, wherein said spiral flange members have an inner end termination comprising linear plate means extending diametrically across said fat removal opening.

11. A fat removal apparatus as recited in claim 10, wherein said power drive means includes a hollow shaft having an internal axially extending passageway having an inlet end communicating with said fat removal opening of said plate portion for receiving fat material therefrom and a discharge end for directing the fat material into receiving means.

12. A fat removal apparatus as recited in claim 11, wherein said front face surface is oriented at an obtuse angle relative to the surface of said liquid body.

13. In a poultry chiller of the type including a chiller tank having a wall portion for containing a body of chilled water having an upper surface on which floating fat accumuates, the improvement comprising fat removal apparatus attached to said chiller tank for removing fat from the surface of the body of chilled water including a rotary fat skimmer means mounted for rotation about an axis of rotation above said surface of said body of chilled water and including a plate portion having an inclined front face surface and an outer periphery partially submerged in said body of chilled water, a fat removal opening provided in said plate portion adjacent said axis of rotation, a fat capture fin or flange means extending forwardly from said front face surface and having a fat directing surface and an inner end at said fat removal opening and an outer leading end edge positioned radially outward from said fat removal opening of said plate portion and power drive means drivingly connected to said plate portion for rotating said plate portion and said capture flange so that said outer end of said fat capture fin or flange means enters and passes through the floating fat and the body of chilled water and moves along an arcuate path through the body of chilled water and exits upwardly through the floating fat on the surface of the body of chilled water and floating fat so that the fat capture flange means separates a portion of the floating fat from the surface of the body of chilled water and directs the separated portion of fat into said fat removal opening as a consequence of continued rotation of said plate portion and said fat capture flange.

14. A fat removal apparatus as recited inc laim 13, wherein said power drive means includes a hollow shaft having an internal axially extending passageway having an inlet end communicating with said fat removal opening of said plate portion for receiving fat material therefrom and a discharge end for directing the fat material into receiving means.

15. A fat removal apparatus as recited in claim 1, wherein said fat capture fin or flange means is of spiral configuration and additionally including retainer hook means extending over and engaging the chiller tank wall means for supporting said fat skimmer means on said wall means.

16. A fat removal apparatus as recited in claim 15, wherein said front face surface is oriented at an obtuse angle relative to the surface of said liquid body and further including means enabling selective variation of said obtuse angle.

17. A method of removing floating fat from the surface of water in a poultry chiller comprising the steps of:
   a) positioning a plate having front face surface oriented at an obtuse angle relative to the surface of the water so that a portion of the front face surface is immersed in the water;
   b) drivingly rotating the plate about an axis of rotation to cause fat contacting the fat carrier surface to be lifted from the water; and
   c) directing the fat on the fat carrier surface to an outflow opening in the center of the plate so that gravity causes the fat to pass through the opening to removal means for permitting final disposition of the fat.

18. The method of claim 17, wherein said outflow opening is substantially axially aligned with said axis of rotation.

19. The method of claim 18, wherein said directing of the fat to the outflow opening is effected by spiral flange means protruding outwardly of said front face surface.

* * * * *